United States Patent [19]

Asakura et al.

[11] 4,334,589
[45] Jun. 15, 1982

[54] TWO-WHEELED MOTORCYCLE WITH COMBINED FRAME AND COWLING STRUCTURE

[75] Inventors: Toshimitsu Asakura, Wako; Azusa Noda, Tokyo, both of Japan

[73] Assignee: Honda Giken Kogyo Kabushiki Kaisha, Tokyo, Japan

[21] Appl. No.: 170,974

[22] Filed: Jul. 18, 1980

[30] Foreign Application Priority Data

Jul. 20, 1979 [JP] Japan ................................ 54/92415

[51] Int. Cl.³ ........................ B62K 11/08; B62K 19/08
[52] U.S. Cl. .................................... 180/219; 180/227; 180/229; 280/281 B
[58] Field of Search ............... 180/219, 225, 227, 228, 180/229; 280/281 B, 281 R

[56] References Cited

U.S. PATENT DOCUMENTS

| | | | |
|---|---|---|---|
| 2,755,873 | 7/1956 | Klaue | 180/229 |
| 2,792,899 | 5/1957 | Piatti | 180/229 |
| 3,375,024 | 3/1968 | Bowden | 280/281 |
| 4,171,731 | 10/1979 | Hilber | 180/225 |
| 4,191,269 | 3/1980 | Nagashima et al. | 280/282 |
| 4,265,330 | 5/1981 | Silk et al. | 180/227 |

Primary Examiner—Joseph F. Peters, Jr.
Assistant Examiner—Donn McGiehan
Attorney, Agent, or Firm—Armstrong, Nikaido, Marmelstein & Kubovcik

[57] ABSTRACT

A two-wheeled motorcycle includes a shell for enveloping a power unit for driving a rear wheel of the motorcycle and to the front end of which a head pipe is fixed. The shell is composed of an upper shell half constituted at least by a top plate and right and left side plates, and a lower shell half constituted at least by left and right side plates and a bottom plate. The power unit is connected to the lower shell half to serve also as a mechanical strength member. The upper and lower shell halves are separably connected to each other at the ends of the side plates thereof.

6 Claims, 4 Drawing Figures

TWO-WHEELED MOTORCYCLE WITH COMBINED FRAME AND COWLING STRUCTURE

BACKGROUND OF THE INVENTION

1. Field of the Invention

The present invention relates to a two-wheeled motorcycle of a type in which a power unit is enveloped by a shell constituting at least a part of the chassis.

2. Description of the Prior Art

In two-wheeled motorcycles, the acceleration performance, driving performance and various other performances are largely affected even by a slight change of the weight, and various measures have been taken to reduce the weight of the two-wheeled motorcycles. Reduction of weight has almost reached a limit in the conventional construction of two-wheeled motorcycles in which the chassis frame is made up of steel pipes or plates with the power unit mounted thereon. A minimum weight is necessary to provide sufficient strength for the frame.

SUMMARY OF THE INVENTION

It is, therefore, a major object of the invention to provide a two-wheeled motorcycle in which a power unit serving also as a mechanical strength member is connected to and contained by a shell of thin sheet constituting at least a part of the chassis, thereby remarkably reducing the weight of the motorcycle a whole when compared with the conventional construction. It is a further object to envelope the power unit with such a shell without using any specific additional cover members.

To this end, according to the invention, there is provided a two-wheeled motor cycle comprising a shell for enveloping a power unit for driving a rear wheel. The front end of the shell is fixed to a head pipe. The shell comprises an upper shell half including at least a top plate and right and left side plates, and a lower shell half including at least left and right side plates and a bottom plate. The power unit serves also as a mechanical strength member by being connected to the lower shell half, the side plates of the upper and lower shell halves being separably connected to each other at their ends.

The above and other objects, features and advantages of the invention will become apparent from the following detailed description of the invention when taken in conjunction with the accompanying drawings, which illustrate a presently preferred embodiment constructed in accordance with the principles of the invention.

DESCRIPTION OF THE PREFERRED EMBODIMENT

Figure 1:
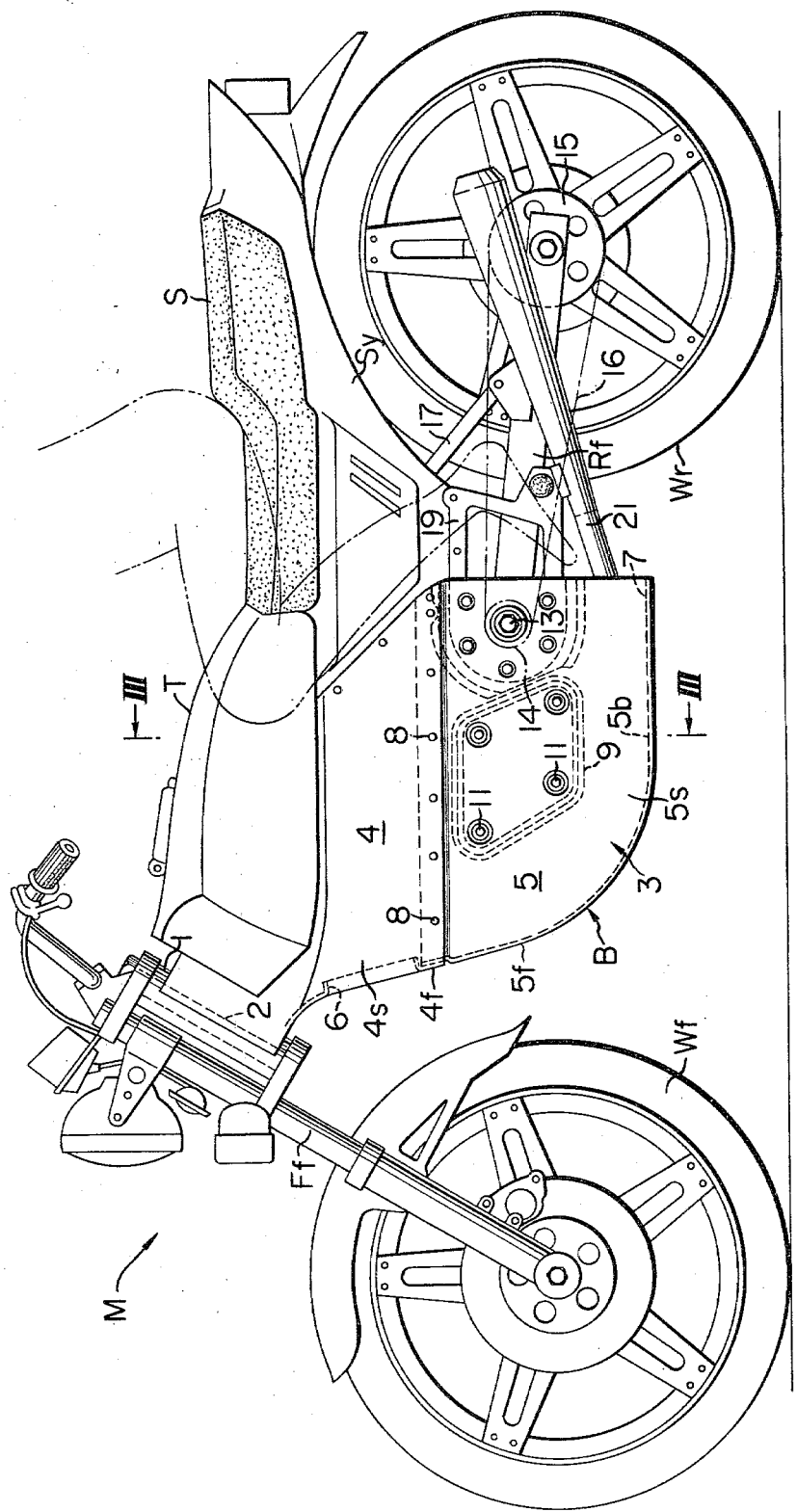
FIG. 1 is a side elevational view of the whole part of a two-wheeled motorcycle constructed in accordance with an embodiment of the invention.
Figure 2:
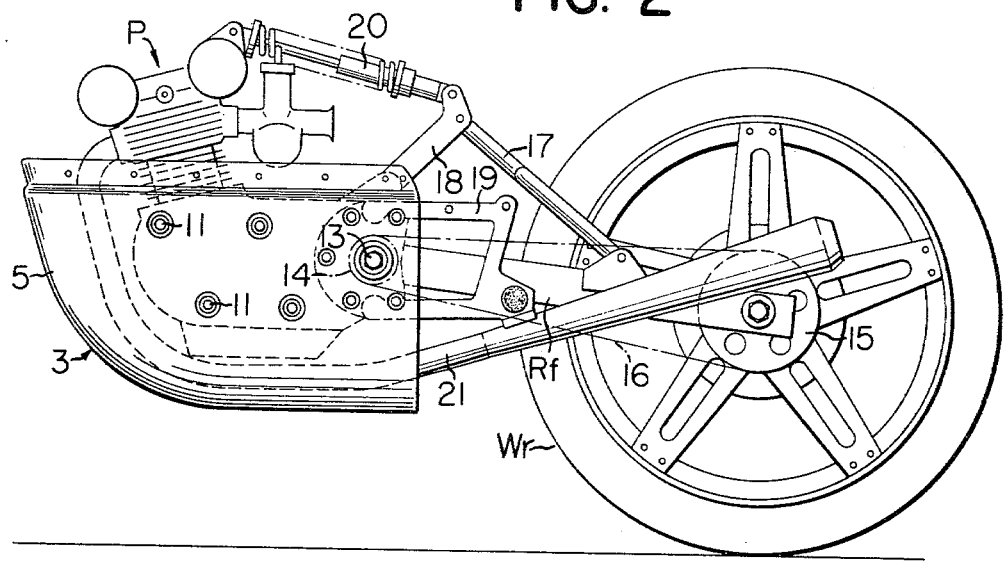
FIG. 2 is a side elevational view of an essential part showing the state of connection between the separated lower shell half and the power unit.
Figure 4:
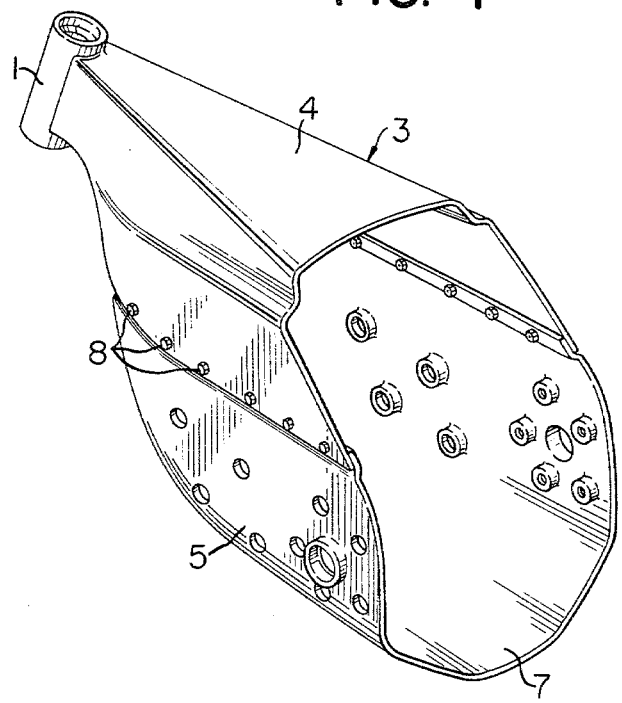
FIG. 4 is a perspective view of a shell.

Referring to the drawings showing a preferred embodiment of the invention, a two-wheeled motorcycle M has a chassis B provided at its front end with a head pipe 1, a front fork Ff carried by the head pipe 1 through a steering shaft 2 and adapted to support a front wheel Wf, a power unit P accommodated by the chassis B and a rear fork Rf pivotally connected to the base end of the power unit P and carrying at its free end both ends of a rear wheel axle.

The chassis B is constituted by a shell 3 of thin plate extending rearwardly downwardly and connected at its front end to the head pipe 1, a fuel tank T provided on the chassis 3 and a seat stay Sy connected to the rear end of the fuel tank and carrying at its upper face a rider's seat S while covering the upper part of the rear wheel Wr. The seat stay Sy is detachably connected to the shell 3 by a suitable attaching means.

The shell 3 is provided at its front end with an air introduction port 6, while the rear end thereof is open to provide an air discharge port 7, and is constructed as a whole in the form of a cylindrical streamlined cowling. The shell 3 is composed of an upper shell half 4 constituted by a top plate 4t, front plate 4f and left and right side plates 4s,4s, and a lower shell half 5 constituted by a front plate 5f, bottom plate 5b and left and right side plates 5s,5s. The aforementioned air introduction port 6 is provided in the upper shell half 4 and, as required, also in the lower shell half 5. The upper and lower shell halves 4,5 are superposed to each other at their front plates and right and left side plates and are separably connected to each other by a plurality of bolts 8.

Figure 3:
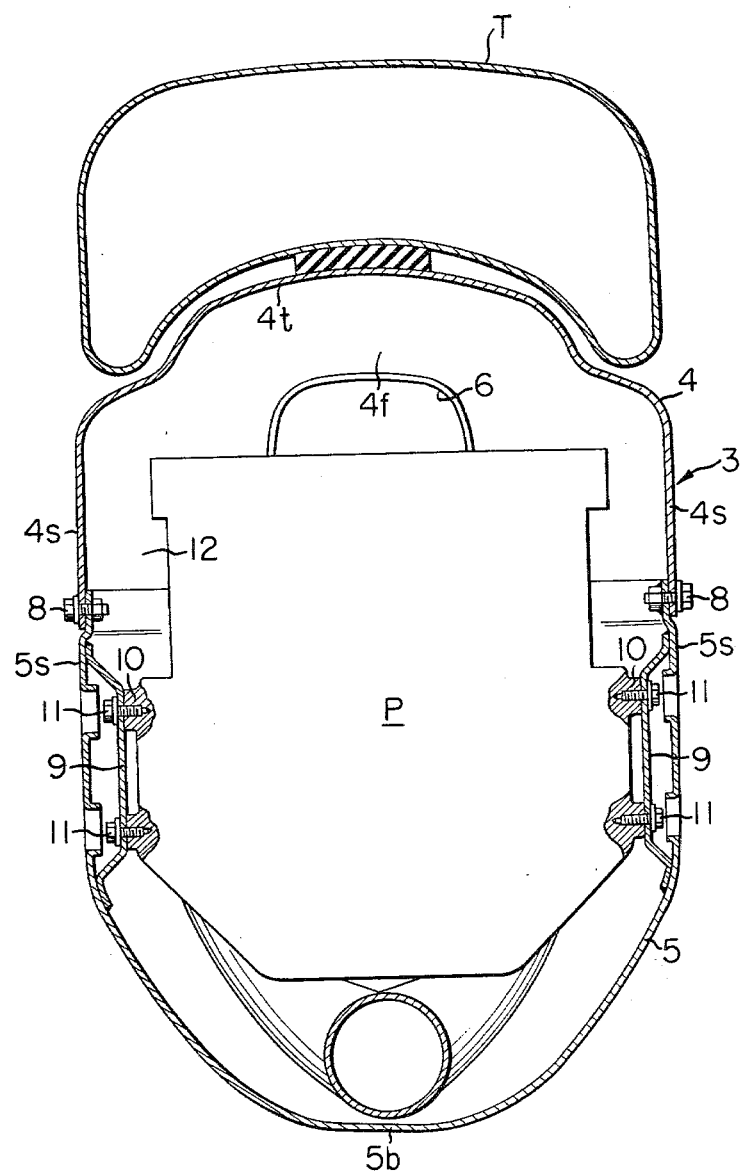
FIG. 3 is a sectional view taken along the line III—III of FIG. 1.

As will be clearly seen from FIG. 3, reinforcement and mounting plates 9,9 are fixed by welding or the like measure to the inner surfaces of the left and right side walls 4s,4s. Bosses 10,10 formed on the left and right side surfaces of the power unit P are put in contact with these reinforcement and mounting plates 9,9 and are detachably secured to the latter by means of bolts 11,11. The attaching of the power unit P to the reinforcement and mounting plates 9,9 is preferably made in advance of the coupling of the upper and lower shell halves.

The power unit P rigidly interconnects both side plates 5s,5s of the lower shell half and shares the mechanical strength of the shell as a whole.

The peripheral surface of the power unit P excepting the portion of connection to the shell 3 is spaced apart from the inner surface of the shell 3 to define therebetween an air passage 12 which interconnects the air introduction port 6 and the air discharge port 7. Accordingly, during running of the motorcycle, the air is naturally taken into the shell 3 and flows out of the latter through the air passage 12 and the air discharge port 7 thereby to effectively cool the power unit P.

The rear fork Rf is pivotally connected at its base end to the rear parts of left and right side walls of the power unit P by means of a pivot shaft 13 for up and down pivotal or swinging movement. The power unit P has an output shaft disposed coaxially with the pivot shaft 13. A chain 16 is stretched between a driving sprocket wheel 14 fixed to the output shaft and a sprocket wheel 15 attached to the hub of the rear wheel Wr. Therefore, the output power from the power unit P is transmitted through the driving sprocket wheel 14, chain 16 and the sprocket wheel 15 to the rear wheel Wr thereby to drive the latter. No slacking nor tensioning of the chain 16 is caused by the swinging of the rear fork Rf, because the driving sprocket wheel 14 is disposed coaxially with the pivot shaft 13 of the rear fork Rf.

A bifurcated link 17 straddling the rear wheel Wr is pivotally secured at its base end to intermediate portions of the left and right legs of the rear fork Rf. A swingable link 18 having an end pivotally connected to the end of the bifurcated link 17 is pivotally secured at its base end to a step bracket 19 projected rearwardly from the rear end of the power unit P. A shock absorber 20 having a sole suspension spring is interposed between the swingable link 18 and the upper end of the power unit P. Therefore, the swingable link 18 is swung back and forth through the action of the bifurcated link 17 to impart an expanding and contracting motion to the shock absorber 20, as the rear fork Rf is swung up and down, to absorb the shock transmitted through the rear wheel.

An exhaust pipe 21 leads from the power unit P to the rear of the mototcycle.

As will be seen from the foregoing description, the weight of the chassis and, hence, the weight of the motorcycle as a whole is remarkably reduced becuase the power unit for driving the rear wheel is connected to and accommodated by a shell made of thin plates to the front end of which a head pipe is connected and which is opened at its rear end, so that the motorcycle can have improved performances such as acceleration performance, running performance and so forth. In addition, the shell having a form of a streamlined cowling contributes to the reduction of air resistance encountered during running of the motorcycle. It is also to be noted that the shell is divided into an upper shell half and a lower shell half carrying the power unit, the upper and lower shell halves being separably connected at the ends of their side plates to each other. This facilitates production of the inventive shell when compared with the production of an integral non-separable shell. The upper side of the lower shell half is widely opened by separating the latter from the upper shell half, to permit an easy mounting and demounting of the power unit and to facilitate the assembling and maintenance work.

What is claimed is:

1. A two-wheeled motorcycle in combination with a combined frame and cowling structure, said motorcycle having a head pipe mounting thereon a front fork, a rear fork for supporting a rear wheel, and a power unit for driving said rear wheel, said combined frame and cowling structure comprising a shell in the form of a streamlined configuration entirely enclosing therein said power unit, said shell being formed of an upper shell half, having a top plate and a pair of opposite side plates, and a lower shell half, having a bottom plate and a pair of opposite side plates, said upper and lower shell halves being detachably joined together at the peripheral edges of said upper and lower side plates, said head pipe being attached to said upper shell half at its front end, said power unit being secured at its opposite sides to the opposite side plates of said lower shell half for reinforcing transverse rigidity of said shell, said rear fork being pivotally mounted on said power unit.

2. A two-wheeled motorcycle as claimed in claim 1, wherein said shell is provided at its front end with an air introduction port and at its rear end with an air discharge port, said air introduction port and said air discharge port being communicated with each other through an air passage defined between said power unit and the inner surface of said shell.

3. A two-wheeled motorcycle as claimed in claim 1, wherein said upper and lower shell halves are connected to each other at the ends of said side plates thereof by means of a plurality of bolts.

4. A two-wheeled motorcycle as claimed in claim 1, further comprising reinforcement and mounting plates fixed to the inner surfaces of said right and left side plates of said lower shell half.

5. A two-wheeled motorcycle as claimed in claim 4, wherein said power unit has bosses formed on the right and left side surfaces thereof, said bosses being put in contact with said reinforcement and mounting plates and detachably secured to the latter by means of bolts.

6. A two-wheeled motorcycle as claimed in claim 1, wherein a rear fork is pivotally secured at its base end to the right and left side walls of said power unit for up and down swinging movement by a pivot shaft which is disposed coaxially with the output shaft of said power unit.

* * * * *